(12) United States Patent
Lopez Taberna et al.

(10) Patent No.: US 7,960,849 B2
(45) Date of Patent: Jun. 14, 2011

(54) METHOD AND SYSTEM OF CONTROL OF THE CONVERTER OF AN ELECTRICITY GENERATION FACILITY CONNECTED TO AN ELECTRICITY NETWORK IN THE PRESENCE OF VOLTAGE SAGS IN SAID NETWORK

(75) Inventors: Jesus Lopez Taberna, Pamplona (ES); Luis Maria Marroyo Palomo, Pamplona (ES); Pablo Sanchis Gurpide, Pamplona (ES); Eugenio Gubia Villabona, Pamplona (ES)

(73) Assignee: Universidad Publica de Navarra, Pamplona (ES)

( * ) Notice: Subject to any disclaimer, the term of this patent is extended or adjusted under 35 U.S.C. 154(b) by 544 days.

(21) Appl. No.: 12/159,710

(22) PCT Filed: Dec. 27, 2006

(86) PCT No.: PCT/EP2006/012554
§ 371 (c)(1),
(2), (4) Date: Jun. 30, 2008

(87) PCT Pub. No.: WO2007/077001
PCT Pub. Date: Jul. 12, 2007

(65) Prior Publication Data
US 2009/0008944 A1    Jan. 8, 2009

(30) Foreign Application Priority Data
Dec. 30, 2005  (ES) .................................. 200503242

(51) Int. Cl.
*H02P 9/48* (2006.01)

(52) U.S. Cl. .............................. 290/44; 322/29; 322/37
(58) Field of Classification Search .................. 290/43, 290/44, 54, 55; 322/29, 37
See application file for complete search history.

(56) References Cited

U.S. PATENT DOCUMENTS
6,847,128 B2 * 1/2005 Mikhail et al. .................. 290/44
(Continued)

FOREIGN PATENT DOCUMENTS
WO   2004/030199 A2   4/2004

OTHER PUBLICATIONS

Vlado Ostovic, "Memory Motors—A New Class of Controllable Flux PM Machines for a True Wide Speed Operation", Institute of Electrical and Electronics Engineers, Sep. 30, 2001, pp. 2577-2584, vol. vol. 1 of 4.

(Continued)

*Primary Examiner* — Nicholas Ponomarenko
(74) *Attorney, Agent, or Firm* — Sughrue Mion, PLLC (57) ABSTRACT

Method and system of control of the converter of an electricity generation facility of the type which comprises at least one electric generator, such as a wind generator, connected to an electricity network, in the presence of voltage sags in said network, the electric generator being a double-fed asynchronous generator formed by two windings, a winding in the stator, directly connected to the network, and a winding in the rotor which is fed on normal regime by said converter which imposes on it a predetermined voltage current called setpoint current. In the event of a voltage sag occurring, the converter imposes a new setpoint current which is the result of adding to the previous setpoint current a demagnetizing current which generates a flow in the rotor winding opposed to the free flow, consequently reducing the voltage in converter connectors.

4 Claims, 6 Drawing Sheets

U.S. PATENT DOCUMENTS

| | | | |
|---|---|---|---|
| 7,256,508 B2 * | 8/2007 | Altemark et al. | 290/44 |
| 7,332,827 B2 * | 2/2008 | Nielsen | 290/55 |
| 7,518,256 B2 * | 4/2009 | Juanarena Saragueta et al. | 290/44 |
| 7,551,463 B2 * | 6/2009 | Ros et al. | 363/89 |
| 7,692,325 B2 * | 4/2010 | Ichinose et al. | 290/44 |
| 7,738,265 B2 * | 6/2010 | Trattler | 363/20 |
| 7,839,008 B2 * | 11/2010 | Woldmann et al. | 290/44 |
| 7,859,125 B2 * | 12/2010 | Nielsen et al. | 290/44 |
| 2005/0116476 A1 | 6/2005 | Feddersen | |

OTHER PUBLICATIONS

Brian J. Chalmers, et al, "Variable-Frequency Synchronous Motor Drives for Electric Vehicles", IEEE Transactions on Industry Applications, Jul./Aug. 1996, pp. 896-903, vol. 32, No. 4.

Z. Q. Zhu, et al, "Maximising the Flux-Weakening Capability of Permanent Magnet Brushless AC Machines and Drives", Power Electronics and Motion Control Conference, 2000, Proceedings., PIEMC 2000, The Third International Aug. 15-18, 2000, Aug. 15, 2000, pp. 552-557, vol. 2.

P. Stewart, et al, "Dynamic Model Tracking Design for Low Inertia, High Speed Permanent Magnet AC Motors", ISA Transactions, 2004, pp. 111-122, vol. 23.

A.K. Adnanes, et al, "A Fully Digital Permanent Magnet Synchronous Motor Drive With Flux Weakening", Electrical Machines and Drives, 1991, pp. 227-231.

D.F. Gosden, et al, "Field Weakening Performance of a Synchronous Motor With Two-Part Rotor", IEE, Sep. 1-3, 1997, pp. 244-247.

Hamid A. Toliyat, et al, "Advanced High-Speed Flywheel Energy Storage Systems for Pulsed Power Applications", IEEE Electric Ship Technologies Symposium, 2005, pp. 379-386.

Christos Mademlis, et al, "A High-Performance Vector Controlled Interior PM Synchronous Motor Drive With Extended Speed Range Capability", IECON'01: The 27th Annual Conference of the IEEE Industrial Electronics Society, Nov. 29, 2001, pp. 1475-1482, vol. vol. 1 of 3.

* cited by examiner

METHOD AND SYSTEM OF CONTROL OF THE CONVERTER OF AN ELECTRICITY GENERATION FACILITY CONNECTED TO AN ELECTRICITY NETWORK IN THE PRESENCE OF VOLTAGE SAGS IN SAID NETWORK

TECHNICAL FIELD OF THE INVENTION

The invention relates to a method and a system for the control of the electricity facility converter, of the type which comprises a wind generator, of the double-feed asynchronous type, connected to an electricity network when a voltage sag occurs in said network.

BACKGROUND OF THE INVENTION

Wind power is in constant growth and is considered, among renewable energies, as the best candidate for becoming a real alternative to conventional, more contaminating power sources such as those derived from fossil fuels such as oil, gas or coal.

The increase in the number of wind facilities, and in consequence the number of wind generators, connected to the electricity network, causes integration problems which slow down said growth. Among these problems, the most important one is related to the behaviour of the wind generators faced by sharp changes in the network voltage, called voltage sags.

The wind generators which are currently most widely used are variable speed wind generators, whereby it has been achieved that the machines suffer less mechanically from gusts of wind that the electricity generated has fewer fluctuations and that greater use is made of the energy.

In particular, within this type of existing electric generators, either synchronous or asynchronous, to produce variable speed, the second one is being opted for due to the fact that synchronous generators have different drawbacks. One of the drawbacks of the synchronous generators is that all the power generated, prior to its supply to the electricity network, must be converted by electronic converters. Said converters should, therefore, be dimensioned to support the whole power of the wind generator, resulting expensive and voluminous. Its power losses also cause a decrease in the total output of the wind generator. In contrast, said drawbacks are improved with the asynchronous generator.

The most widely used asynchronous generator is the double-fed asynchronous generator wherein the stator winding is directly connected to the network whilst the rotor is connected to the network via a converter which permits controlling both the active and reactive power of the electric generator. Due to the fact that, the power which passes through the rotor is only a small fraction of that of the stator, the converters are smaller in cost and size, and generate fewer losses.

Although many of the features of the wind generators are improved with double-fed asynchronous generators, the robustness of the electricity generation facility is reduced due to the fact that said double-fed asynchronous generators are very sensitive to the faults that may arise in the electricity network, such as voltage sags. In particular, the power converter which is connected to the generator rotor is a very vulnerable part of the system due to the fact that when a voltage sag occurs in one or several lines, the current which appears in said converter may reach very high values, and may even destroy it.

This high current is produced during the voltage sags and is due to the demagnetization of the generator until this reaches the new state of magnetization corresponding to the voltage existing during said voltage sag. This transitory situation which occurs in the generator during the voltage sags generates an overvoltage, with the consequent overcurrent, which generates a flow in the rotor, hereinafter called free flow.

In normal conditions, the demagnetization of the generator is performed in the stator's resistance, where the magnetic energy is transformed into heat. In this way, the duration of the transitory is linked to the constant of natural time of the stator which is typically of the order of one or several seconds, the sufficient time to damage or even destroy the converter in the event of a voltage sag.

The typical solution to avoid the generator converter from being affected by these high currents which arise in the voltage sags consists of accelerating said demagnetization process and protect the converter from the associated overvoltages and overcurrents induced by said free flow.

To accelerate this process, fixed or variable resistances can be connected, in the stator or in the rotor and in series or in parallel, which reduce the demagnetization time, or, alternatively, the converter is used.

The most widely used technique, called crowbar, is based on the use of resistances of very low value, even reaching short-circuit, which are connected, using a thyristor bridge, in parallel with the rotor, if overcurrents are detected in the stator or in the rotor or overvoltages are detected in the rotor or in the DC bus. Nevertheless, this technique involves different drawbacks, such as due to the fact that the resistances used are of very low values, on the one hand, the demagnetization time continues to be considerable and, on the other, overcurrents are generated in the generator if the generator continues connected to the electricity network, which means that to avoid these overcurrents the network generator is disconnected and is not reconnected until the voltage returns to its nominal value. In this way, the converter is protected with this technique, but the generator is disconnected from the network, even through it may be for a short period of time.

An example of application of this technique is the system described in document WO200403019, which proposes including an electronic switch between the stator winding and the electricity network whereto it is connected, and a demagnetization element connected in parallel to either the stator or to the rotor. Said demagnetizing element is a variable resistance. In this system, if a sharp variation is detected in the voltage network, the generator is disconnected from the electricity network and the demagnetization element is connected. This element is controlled so that the voltage of the generator connectors is equalled, which is known as the magnetization status of the generator, with the new voltage of the network. With this control, the stator flow is set in a short period of time to a flow value which corresponds to the real voltage of the network, so that there exists a coincidence in the flow value and its phase between the induced voltage of the stator and the network voltage before the generator is reconnected to the network. If this is the case, once these two voltages have been equalled the generator is reconnected to the network and the demagnetization element is disconnected. This example, in addition to requiring the disconnection of the generator from the network would cause the continuous connection and disconnection of the demagnetization unit in the case of single-phase and/or two-phase voltage sags.

According to the state of the art, an objective of the present invention is to provide the known electricity generation installations from wind power with an alternative solution to the crowbar to control its behaviour in the event of voltage sags. The alternative solution should guarantee that the wind generator the installation comprises does not disconnect from the electricity network to which it is connected, overcoming the drawbacks that are derived from disconnecting it from and connecting it to the network in the event of voltage sags.

In particular, an object of the present invention is that the electricity generation facility converter is capable of withstanding the occasional situations of voltage sags without this being damaged and without needing to make use of the disconnection thereof.

EXPLANATION OF THE INVENTION

The control method of the converter of an electricity generation facility in the presence of voltage sags object of the invention, which overcomes the aforementioned drawbacks, applicable to facilities which comprise at least one electric generator, such as a wind generator, connected to an electricity network, the electric generator being a double-fed asynchronous generator formed by two windings, a winding in the stator, directly connected to the network, and a winding in the rotor which is fed on normal regime, in controlled form, by said converter which imposes on it a predetermined voltage current called setpoint current.

In essence, the method is characterized in that, in the event of a voltage sag occurring, the converter imposes a new setpoint current which is the result of adding to the previous setpoint current a new term, called demagnetizing current, which generates a flow in the rotor winding opposed to the free flow, the free flow $\psi_{sl}$ being that which is not caused by the direct component of the stator voltage, consequently reducing the voltage in converter connectors.

According to another characteristic of the invention, the demagnetizing current is proportional to the value of the free flow $\psi_{sl}$ of the generator stator, estimated as the difference between the value of the magnetic flow in the generator stator $\psi_s$ and the value of the stator flow associated to the direct component of the stator voltage, called forced flow $\psi_{sf}$.

With the object of providing a solution to the problems considered, a system is also disclosed for the embodiment of a method according to the invention which comprises at least one double-fed asynchronous generator connected to an electricity network, wherein the rotor winding is fed on normal regime, in controlled form, by a converter which, governed by a control unit, imposes a predetermined voltage current called setpoint current.

In essence, the system is characterized in that the control unit comprises an auxiliary module which incorporates a first unit for the estimate of the value of the stator flow; a second unit for the estimate of the stator flow associated to the direct component of the stator voltage, called forced flow, in the event of a voltage sag occurring in the network; a third unit, which calculates the difference between the values of the stator flow and the previously estimated forced flow; a fourth unit, multiplier, which multiplies the value of the previously calculated difference by a K2 factor for the production of the demagnetizing current; and a fifth unit, for the sum of the value of the previous setpoint current and the value of the previously calculated demagnetizing current.

According to another characteristic of the invention, the K2 factor is less than 1.

BRIEF DESCRIPTION OF THE DRAWINGS

The attached drawings illustrate, by way of non-limitative example, a preferred embodiment of the system and method object of the invention. In said drawings:

FIGS. 6a, 6b, 6c, 6d, 6e, 6f and 6g 5g are respective graphics of the evolution of the main electrical variables which arise in the wind generator of the example, if the control method is applied according to the invention, in the event of a two-phase voltage sag.

DETAILED DESCRIPTION OF THE DRAWINGS

The large majority of wind generators connected to an electricity network are comprised of a double-fed asynchronous generator 11. Said generators contain two windings, a winding in the stator, directly connected to the network 8, and a winding in the rotor 13 provided with a converter 22 which in normal regime feeds the generator 1, in controlled form, with currents which permit regulating both the active and reactive power of the generator 1.

Figure 1:
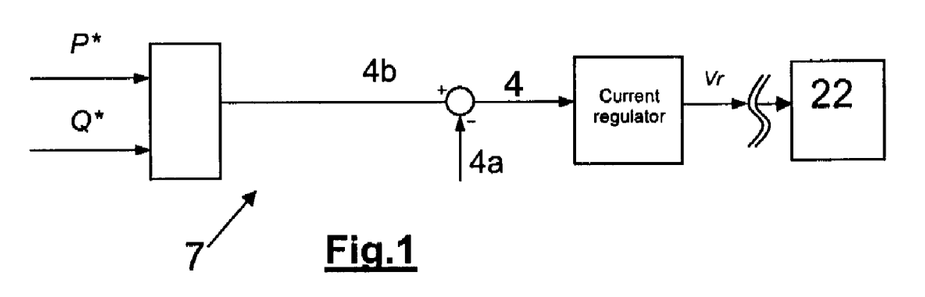
FIG. 1 is a schematic representation of the control of a conventional electricity generation facility.

As is represented schematically in FIG. 1, the control of the converter 22 is conventionally carried out by a control unit 7 which imposes a desired rotor current, or setpoint current 4b, to the rotor winding 13 (see FIG. 2), from desired active P* and reactive Q* powers.

Said control unit 7 further comprises what it known a control loop, specifically a current loop which continually compares the setpoint current 4b with the real current 4a in order to make the current regulator apply the precise voltage Vr to the converter 22 to cancel out the differences between both currents.

Figure 2:
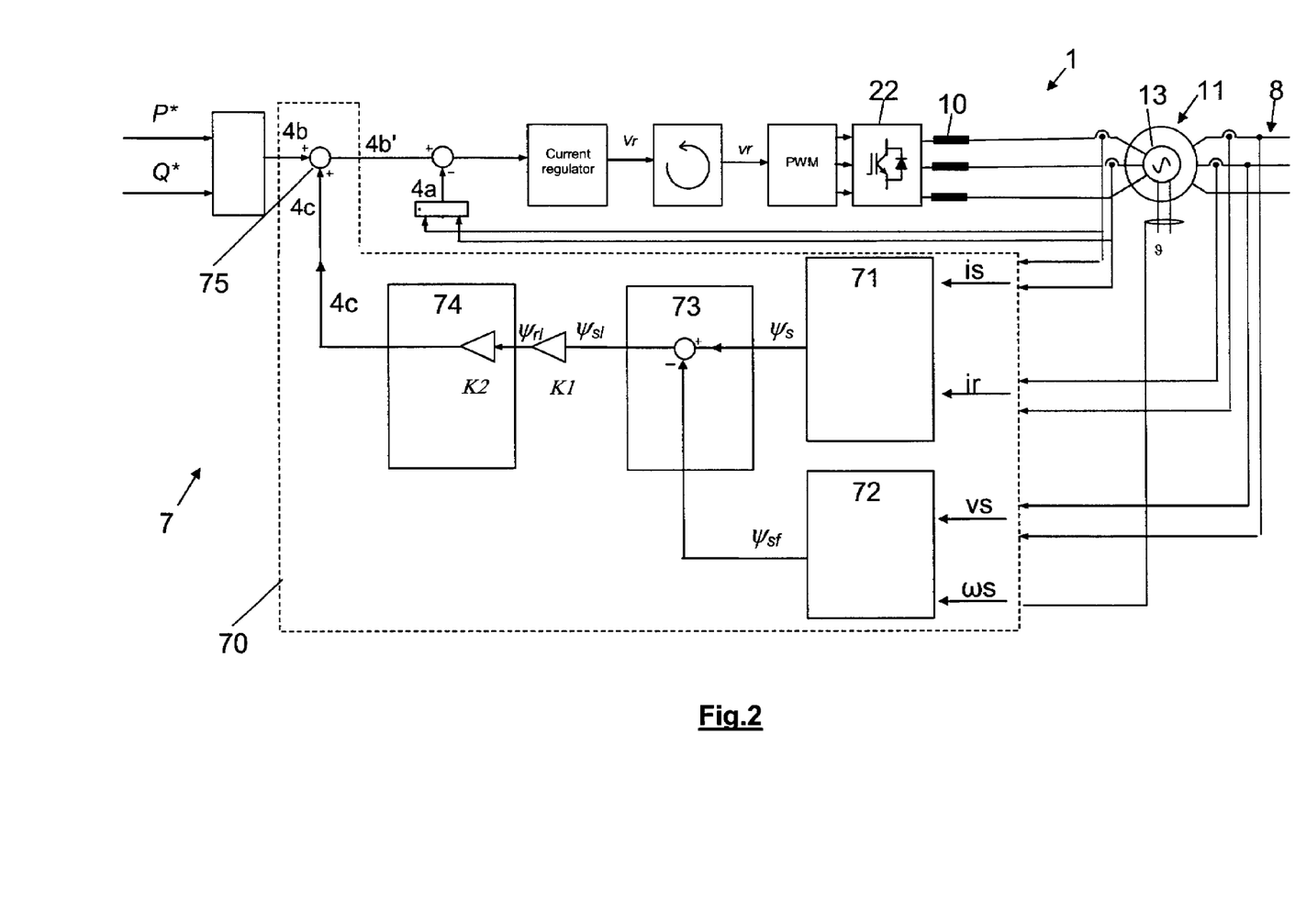
FIG. 2 is a block diagram of a system to perform the method according to the invention.

In this specific case, and in accordance with the method of the invention represented schematically in FIG. 2, in the event of a voltage sag occurring, at the setpoint current 4b, calculated to achieve the desired active and reactive powers, also called power setpoint current, a term is added to it to reduce the voltage in converter connectors 22. Hereinafter this new term will be called demagnetizing current 4c.

Specifically, as is shown in the example of said FIG. 2, the value of the rotor current that the converter 22 imposes, in the event of a voltage sag occurring, is the result of adding to the setpoint current 4b a demagnetizing current 4c in phase with the so-called free flow $\psi_{sl}$, the free flow $\psi_{sl}$ being that which exists in the asynchronous generator 11 and is not caused by the direct component of the stator voltage. The demagnetizing current 4c calculated in this manner generates a flow in the rotor winding 13 opposed to said free flow $\psi_{sl}$, consequently reducing the voltage in converter connectors 22.

During the situation of voltage sag in the network 8, the current loop compares the real current 4a with the new setpoint current 4b', which comprises the demagnetizing current 4c which is in phase with the free flow $\psi_{sl}$. This demagnetizing current 4c permits making all or a large part of the voltage in the transitory induction of the rotor of the asynchronous generator 11 drop, reducing the voltage the converter 22 sees, so that the maximum of said converter 22 is not exceeded.

The diagram represented in the same FIG. 2 shows a variant of implementation for the aforementioned embodiment of the invention which comprises, in the control unit 7, an auxiliary module 70 provided with:

a first unit 71 for the estimate of the value of the stator flow $\psi_s$;

a second unit 72 for the estimate of the stator flow associated to the direct component of the stator voltage, called forced flow $\psi_{sf}$;

a third unit 73, which calculates the difference between the values of the stator flow ($\psi_s$) and of the forced flow ($\psi_{sf}$) previously estimated in the first and second units respectively;

a fourth unit, multiplier, which multiplies the value of the previously calculated difference by a K2 factor for the production of the demagnetizing current 4c; and a fifth unit, for the sum of the value of the setpoint current and the value of the previously calculated demagnetizing current.

With regard to the values of said total flow $\psi_s$ and forced flow $\psi_{sf}$, the first can be obtained using methods well known in the state of the art, from the current in the stator and in the rotor, whilst the module of the second one, that of the forced flow, which is associated to the direct component of the stator voltage, can be estimated for the case of three-phase voltage sags from the following expression:

$$\psi_{sf} \equiv \frac{|\vec{V}_s - R_s \cdot \vec{i}_s|}{\omega_s}$$

wherein $i_s$ is the stator current; $\omega_s$ is the frequency of the network voltage; $R_s$ is the stator resistance; $V_s$ is the stator voltage; and $\psi_{sf}$ is said forced flow.

In the event of asymmetric voltage sags (single-phase and two-phase) the network voltage 8 contains an inverse component which makes a flow associated to said component appear in the asynchronous stator generator 1. To reduce the voltage in converter connectors 22 it is then necessary that the demagnetizing current 4c also opposes said flow. In these circumstances, the expression previously presented for the unit 72 is no longer valid, since it does not take into account the inverse component of the network voltage. A possible option is to separate the two components, direct and inverse, which compose the network 8 voltage, using filtration techniques which are well known in the art.

In relation to the third unit 73, it comprises a comparer which is in charge of producing the difference between the values of the stator flow and the forced flow previously estimated in the first and second units 71 and 72, respectively. The result of this difference provides the value of said free flow $\psi_{sl}$ of the generator stator 1, which is then multiplied by a K1 constant (Lm/Ls, where Lm is the mutual inductance of the generator 1 and Ls is the inductance of the generator stator 1) to obtain the value of the free flow of the generator rotor. The value obtained is multiplied in the fourth unit 74 by a constant K2, provided for said purpose with a multiplier. The resulting value is that of the demagnetizing current 4c, which is proportional to the free flow but with changed sign, which added to the setpoint current 4b determines the value of demagnetizing current 4c. This demagnetizing current 4c is advanced 90° to the voltage induced by said free flow of the generator 1. The component associated to the demagnetizing current 4c which circulates through the rotor 13 induces an additional flow in the rotor 13 opposed to said free flow, so that the voltage induced in converter connectors 22 is reduced. By introducing the correct value of the demagnetizing current 4c it is possible to avoid the maximum permitted voltage of the converter. This being the case, the converter 22 is protected, its deactivation not being necessary and, therefore, the disconnection of the generator 1 from the network 8.

Example of Application:

As an example of application, below we describe the behaviour of a 1.5 MW wind generator in the case of a crowbar 9 with variable resistances being used, one of the typical techniques in the state of the art, and in the case that the technique proposed in the invention is used. The behaviour of the generator analysed for the types of voltage sags most common in the electricity networks: three-phase sags and two-phase sags, due to the short-circuit of two of the network phases. Said generator 1, consists of a coiled rotor asynchronous generator 11 with the following characteristics:

| | |
|---|---|
| Nominal power | 1.5 MW |
| Voltage nominal of the stator | 12 kV |
| Current nominal of the stator | 67 A |
| Voltage nominal of the rotor | 358 V (20% slide) |
| Nominal current of the rotor | 454 A |
| Magnetizing inductance, Lm | 0.9 H |
| Stator inductance, Ls | 0.95 H |
| Transitory inductance of the rotor, $\sigma \cdot Lr$, relating to the stator | 0.09 mH |

In all the cases described below, the converter 22 of the rectifying-conversion circuit of said electricity generation facility work with a DC bus voltage of 1200V.

Protection by a Crowbar with Variable Resistances:

In the event of a voltage sag, when the rotor current or the voltage of the DC bus exceeds a certain level (which in the case of the example is 1,130 A or 1,300 V respectively), the crowbar will be activated, short-circuiting the rotor 13 by a time-variable resistance.

Figure 3A:
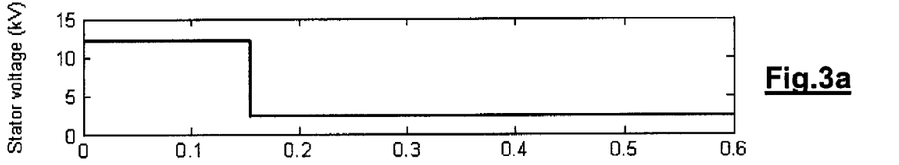
FIGS. 3a, 3b, 3c, 3d, 3e, 3f and 3g are respective graphics of the evolution of the main electrical variables which arise in the wind generator of the example, according to the current state of the art in the event of a three-phase voltage sag occurring.
Figure 3B:
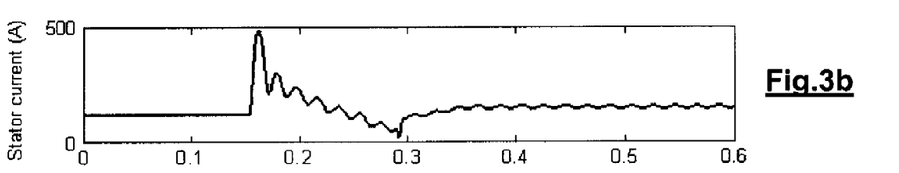
Figure 3C:
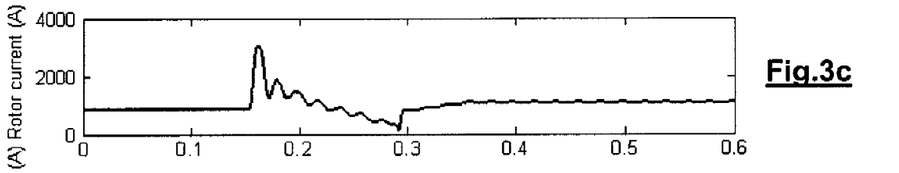
Figure 3D:
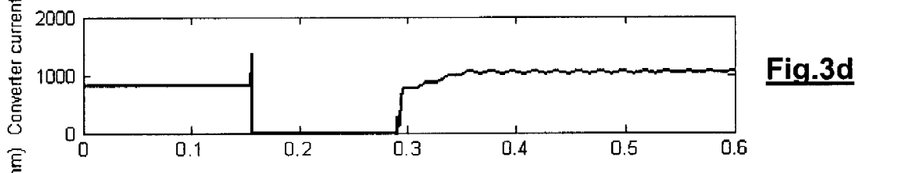
Figure 3E:
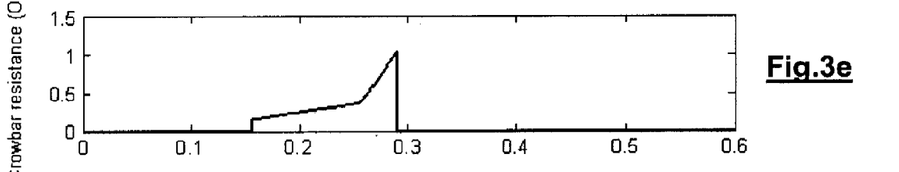
Figure 3F:
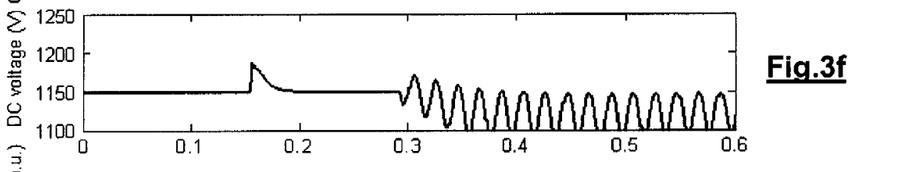
Figure 3G:
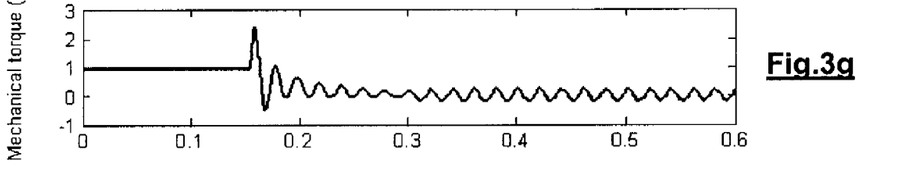
Figure 4A:
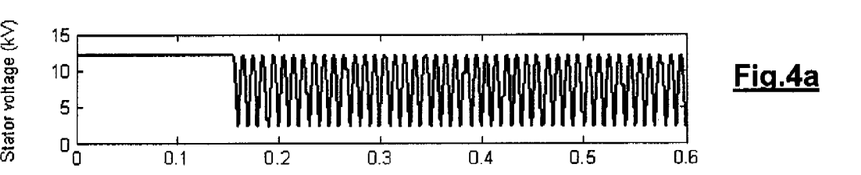
FIGS. 4a, 4b, 4c, 4d, 4e, 4f and 4g are respective graphics of the evolution of the main electrical variables which arise in the wind generator of the example, according to the current state of the art in the event of a two-phase voltage sag occurring.
Figure 4B:
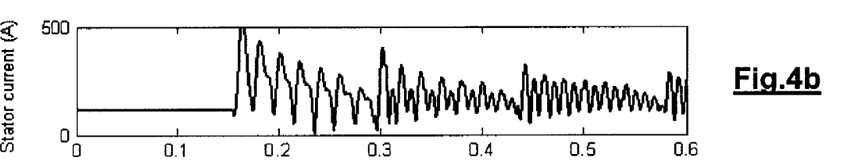
Figure 4C:
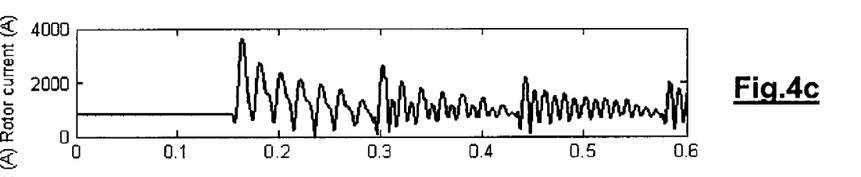
Figure 4D:
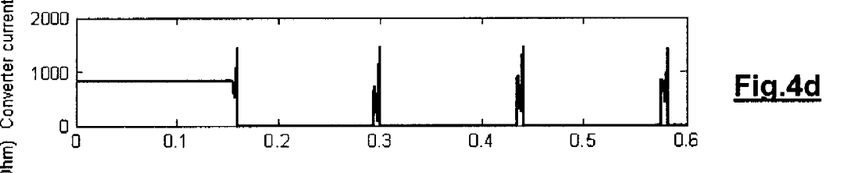
Figure 4E:
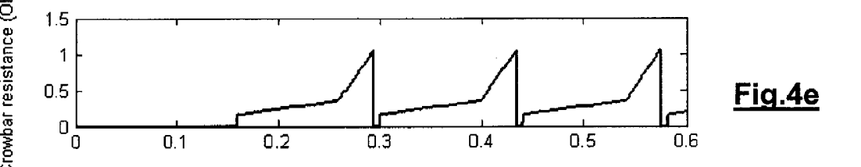
Figure 4F:
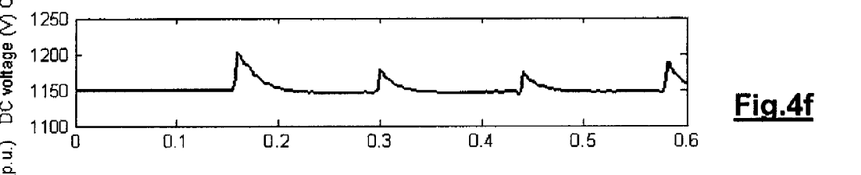
Figure 4G:
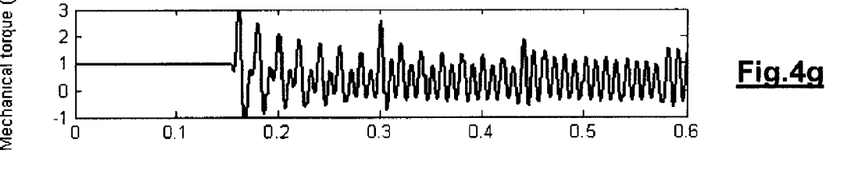
Figure 6A:
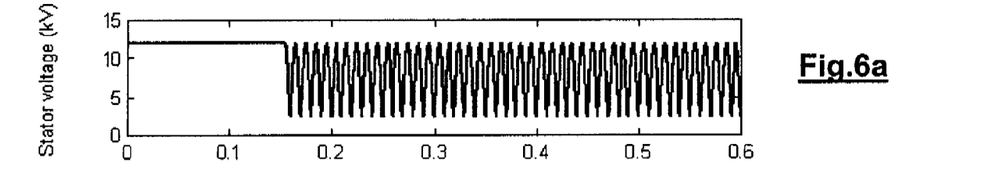
Figure 6B:
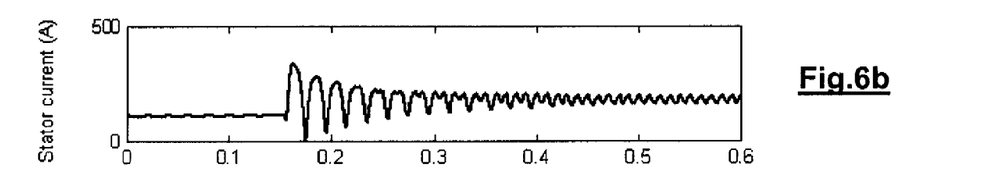
Figure 6C:
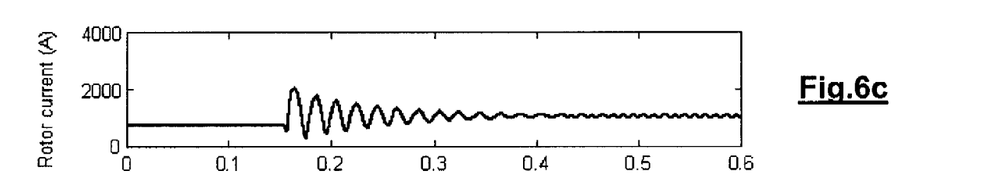
Figure 6D:
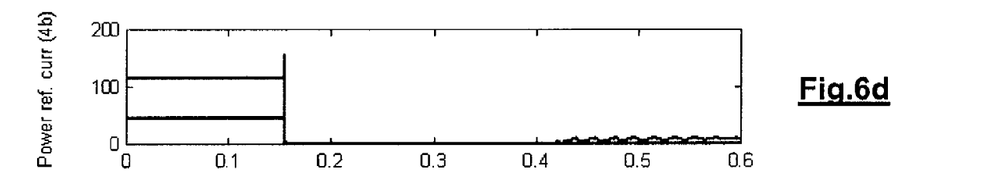

FIGS. 3a to 3g represent the evolution of the variables in the event of an 80% three-phase voltage sag. FIG. 6a depicts the effective value of the network 8 voltage, observing the appearance of the voltage sag at instant t=0.25 s. Next, FIGS. 3b, 3c and 3d show the evolution of the effective value of the current in the stator, in the rotor and in the converter 22 respectively. At the point when the voltage sag occurs, the three currents begin to rapidly rise. When the rotor current exceeds the preset value, the control unit 7 activates the crowbar and the rotor current begins to circulate through the crowbar. Generally, whilst the crowbar is active the converter is deactivated and its current is cancelled out, as is observed in FIG. 3d, in this way protecting the converter from overcurrents of up to 3,500 A which arise in the rotor. In FIG. 3e we can observe the value of the resistance imposed by the crowbar. Conventionally, a pre-programmed resistance of a duration of around 100 ms is usually made to follow the crowbar. Once this time has passed, the crowbar is deactivated, stops driving, and the rotor current then starts recirculating through the converter which is reactivated. On the other hand, FIG. 3f shows the evolution of the voltage of the DC bus of the converter and FIG. 3g shows the evolution of the generator 1 torque, where it is observed that in the time where the crowbar is activated, a peak torque is produced (torque surge) 2.5 times the nominal torque of the generator 1.

FIGS. 4a to 4g represent the evolution of the different electric variables in case of a two-phase voltage sag of 80% depth. In this case, in addition to overcurrents and torque surges appearing similar to the previous case, in FIG. 4g we can clearly see how, unlike the previous case, wherein the crowbar is activated just once, said crowbar should be connected and disconnected successively throughout the voltage sag to protect the converter of the rectifying-conversion circuit 2. This means that the converter will be deactivated throughout the voltage sag, losing control of the generator 1. This behaviour, as described in the background of the present invention, is not desired for the stability of the electricity network 8.

Protection by the Introduction of a Demagnetizing Current 4c:

In this case, the generator 1 makes a current 4b' circulate through the rotor which includes a component associated to the demagnetizing current 4c introduced to reduce the flow of the generator 1 and, in this way, reduce the voltage that appears in converter connectors of the rectifying-conversion circuit. The demagnetizing current 4c is calculated following the method shown in FIG. 2, wherein first the total flow of the stator $\psi_s$ is calculated and subsequently or simultaneously the forced flow $\psi_{sf}$ is calculated via the voltage and the current in the stator using the following expression:

$$\vec{\psi}_{sf} \equiv \frac{\vec{v}_s - R_s \cdot \vec{i}_s}{j\omega_s}$$

This expression allows the protection technique to work with three-phase voltage sags and asymmetric voltages sags. Introducing the value of the forced flow thus calculated in the subtraction unit 72, the sum of the free flow is obtained and that of double the flow associated to the inverse component of the voltage. The result is then multiplied by the constant K1=Lm/Ls, in the example equal to 0.94, to obtain the value of the rotor flow. Finally, the demagnetizing current 4c is obtained by multiplying this last flow by a factor K2 equal to 0.5, calculated to compensate all the inverse flow and half of the free flow.

Figure 5A:
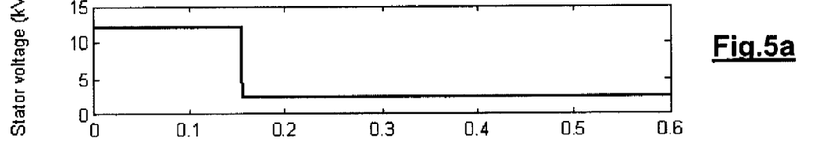
FIGS. 5a, 5b, 5c, 5d, 5e, 5f and 5g are respective graphics of the evolution of the main electrical variables which arise in the wind generator of the example, if the control method is applied according to the invention, in the event of a three-phase voltage sag.
Figure 5B:
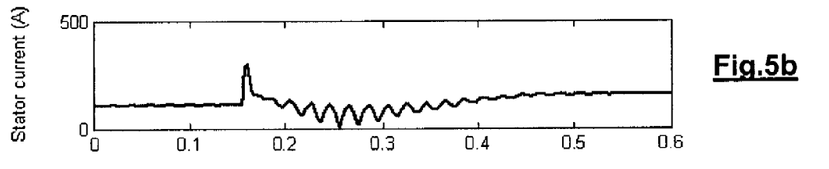
Figure 5C:
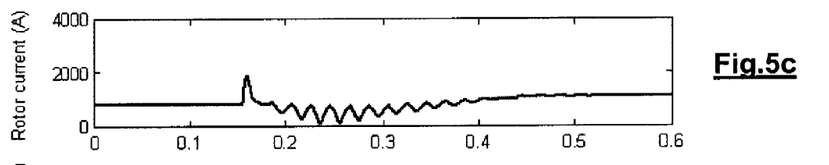

FIGS. 5a to 5g show the evolution of the different electrical variables of the generator 1 in the event of an 80% three-phase voltage sag occurring. FIG. 5a represents the effective value of the voltage of the electricity network 8. At instant t=0.25 s the three-phase voltage sag occurs which makes the voltage drop to 20% of its nominal value. FIGS. 5b and 5c show the evolution of the effective value of the current in the stator and in the rotor (which in this case is the same as in the converter), respectively. As with the figures described in the previous case, the currents begin to quickly increase at the time when the voltage sag occurs.

Figure 5D:
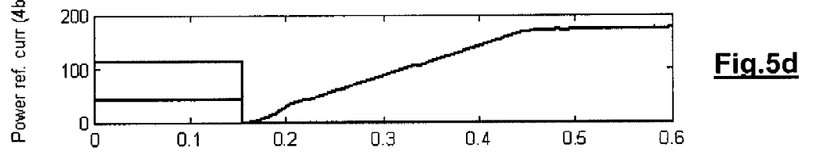
Figure 5E:
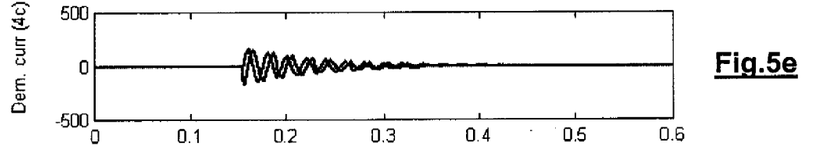

FIGS. 5d and 5e show the setpoint current 4b and the demagnetizing current 4c which, added together, give the new setpoint current 4b' which is made to circulate through the generator 1 rotor. The currents are shown decomposed in axes d and q. The setpoint current is momentarily cancelled to facilitate the control of the generator 1. It can be observed how the frequency of the demagnetizing current is approximately 50 Hz. This is due to the fact that said current is proportional to the free flow which, in the case of three-phase voltage sag, is seen by the rotor as a rotatory flow of the rotor rotation, 60 Hz in the case of the figure.

Figure 5F:
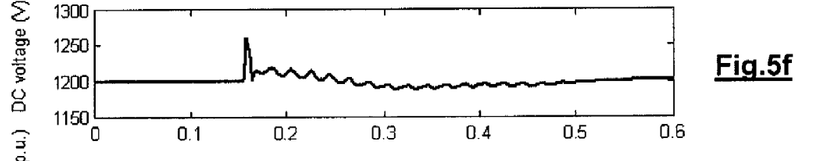
Figure 5G:
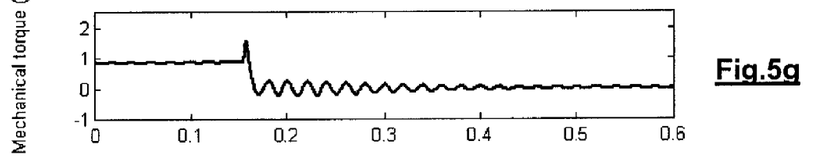

The evolution of the voltage in the DC bus of the converter is shown in FIG. 5f. FIG. 5g shows how the peak in the torque (torque surge) which arises in the first instant of the voltage sag is quite inferior to that obtained using a crowbar, in this case, 1.5 time the nominal torque.

Figure 6E:
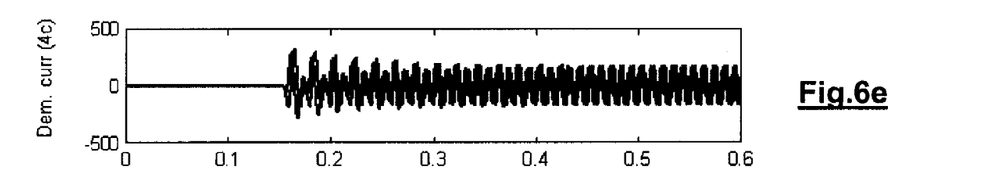
Figure 6F:
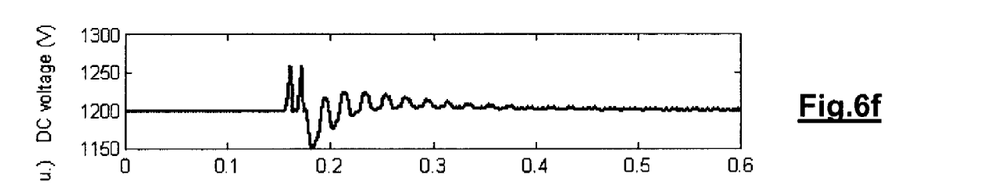
Figure 6G:
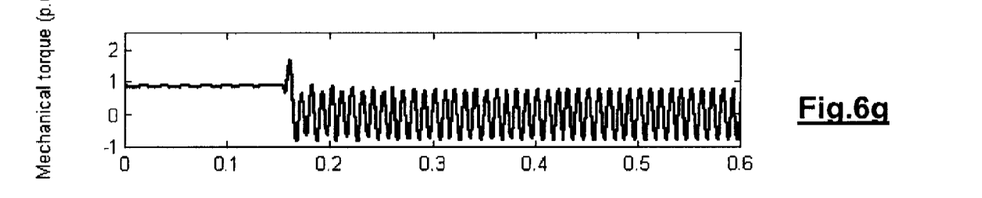

FIGS. 6a to 6g are similar to the aforementioned figures except that they correspond to a two-phase sag with a depth of 80%. It can be observed how the solution based on the invention, unlike in the case of using a crowbar 9, also functions with two-phase sags, maintaining the currents and the voltages at values which involve no danger for the different system components. It should also be highlighted that the frequency of the demagnetizing current 4c which is made to circulate through the rotor 13 of the generator, shown in FIG. 6e, is greater in the case of the two-phase sag than the three-phase sag. The reason is that in the asymmetric voltage sags (single-phase or two-phase) there appears an inverse flow which is seen by the rotor 13 as a rotatory flow at a frequency equal to the sum of the rotor 13 rotation frequency and the electricity network 8 frequency, in the case of the example 110 Hz=60 Hz+50 Hz.

The invention claimed is:

1. Control method of the converter (22) of an electricity generation facility of the type which comprise at least one electric generator (1), such as a wind generator, connected to an electricity network (8), in the presence of voltage sags in said network, the electric generator being a double-fed asynchronous generator (11) formed by two windings, a winding in the stator, directly connected to the network, and a winding in the rotor (13) which is fed on normal regime, in controlled form, by said converter which imposes on it a predetermined voltage current called setpoint current (4b);

characterized in that, in the event of a voltage sag occurring, the converter imposes a new setpoint current (4b') which is the result of adding to the previous setpoint current a new term, called demagnetizing current (4c), which generates a flow in the rotor winding opposed to the free flow, the free flow $\psi_{sl}$ being that which is not caused by the direct component of the stator voltage, consequently reducing the voltage in converter connectors.

2. Method according to claim 1, characterized in that the demagnetizing current (4c) is proportional to the value of the free flow $\psi_{sl}$ of the generator stator, estimated as the difference between the value of the magnetic flow in the stator of the generator $\psi_s$ and the value of the stator flow associated to the direct component of the stator voltage, called forced flow $\psi_{sf}$.

3. System for the embodiment of the method according to claim 1, particularly applicable to an electricity generation facility, of the type which comprise at least one double-fed asynchronous generator (11) connected to an electricity network (8), wherein the rotor winding (13) is fed on normal regime, in controlled form, by a converter (22) which, governed by a control unit (7), imposes a predetermined voltage current called setpoint current (4b), characterized in that the control unit comprises an auxiliary module (70) which incorporates a first unit (71) for the estimate of the value of the stator flow ($\psi_s$);

a second unit (72) for the estimate of the stator flow associated to the direct component of the stator voltage, called forced flow ($\psi_{sf}$), in the event of a voltage sag occurring in the network;

a third unit (73), which calculates the difference between the values of the stator flow ($\psi_s$) and of the previously estimated forced flow ($\psi_{sf}$);

a fourth multiplying unit (74), which multiplies the value of the previously calculated difference by a K2 factor for the production of the demagnetizing current (4c); and a fifth unit (75), for the sum of the value of the setpoint current (4b) and the value of the previously calculated demagnetizing current (4c).

4. System according to the claim 3, characterized in that K2 is less than 1.

* * * * *